May 1, 1934.　　　W. T. BIRCH　　　1,956,787
REGULATOR AND RELIEF VALVE
Filed Feb. 3, 1933
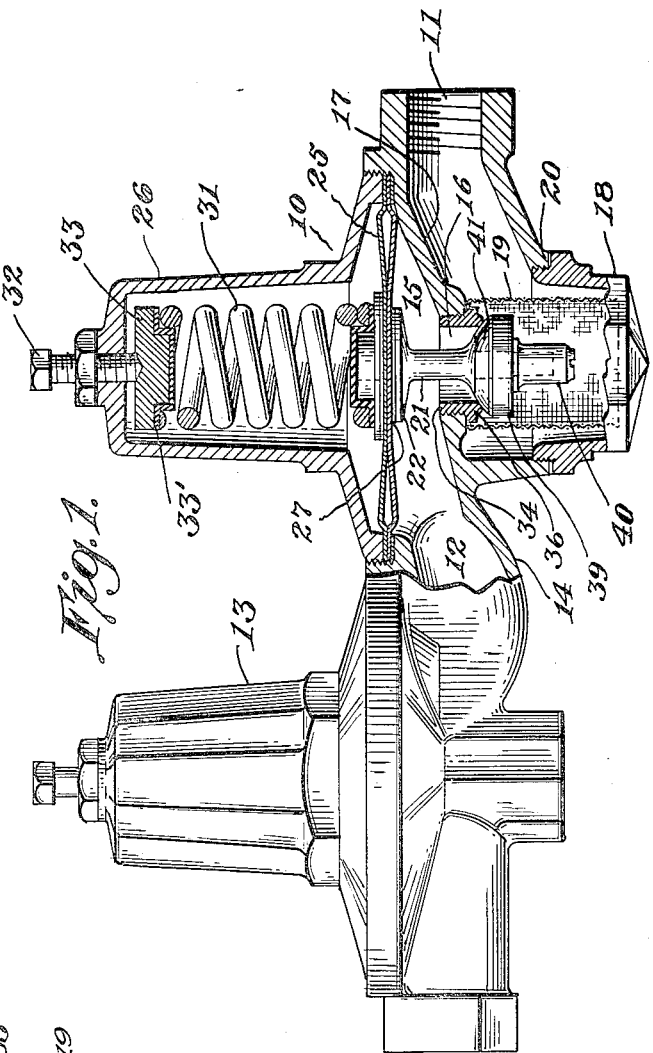
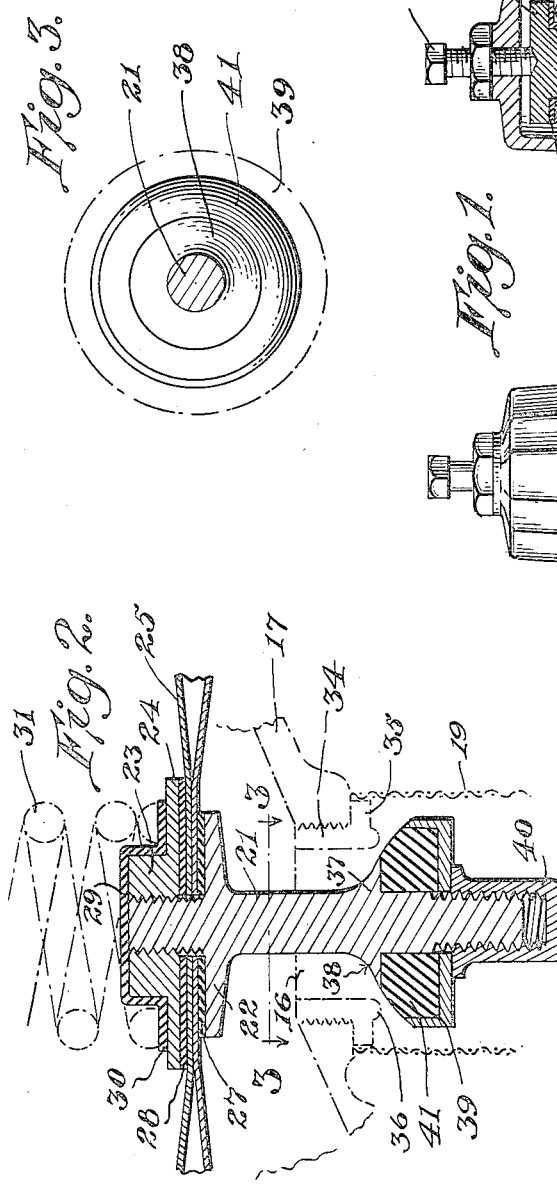
Inventor
William T. Birch
By Charles W. Hills
Attorneys Patented May 1, 1934

1,956,787

UNITED STATES PATENT OFFICE 1,956,787

REGULATOR AND RELIEF VALVE

William T. Birch, Chicago, Ill.

Application February 3, 1933, Serial No. 655,120

4 Claims. (Cl. 50—23)

The present invention relates to fluid pressure regulators, and more particularly to regulators used in conjunction with pressure relief valves in closed hot water heating systems.

The regulator herein described is an improvement of the regulator described in my copending application Serial No. 528,554, filed on April 8, 1931, and is, in part, a continuation of that application.

It is an object of the invention to provide means to prevent chattering and noisy operation of a fluid pressure regulator, and to thereby overcome a serious objection to regulators when installed in homes, offices, and public buildings where a noisy regulator is a nuisance, and at times causing apprehension as to the safety of the occupants of the building.

It is also an object of the invention to provide an improved valve construction whereby a Venturi channel effect is produced by the cooperating valve head and seat and smooth functioning of the regulator is accomplished.

It is also an object of the invention to provide an improved valve head construction to reduce wear of the parts subject to fluid flow and thereby provide a regulator having a long life and requiring the minimum of expense and effort to maintain it in good working order.

It is also an object of the invention to provide resilient cushioning means cooperable with a valve and its actuating means to provide smooth and positive functioning of the valve as it moves to the closing position, and thereby prevent hunting of the valve about its closing position and noise and water hammer that would otherwise accompany hunting of the valve.

In the drawing:

Figure 1 shows regulator and relief valve structure with parts in elevation and in section.

Figure 2 shows details of the valve with parts in elevation, and in section, and with parts broken.

Figure 3 is a plan view of the valve head of Figure 2, with shade lines to indicate the curvature of the parts.

Referring particularly to Figure 1, the regulator unit has a casing indicated generally at 10, and the casing is preferably made integral with a casing enclosing a pressure relief valve for use in hot water heating systems. At one end, the casing 10 is provided with a water inlet 11, into which a water service pipe is connected in use, and at the other end there is an outlet 12 communicating with a relief valve unit 13 through a passaged neck 14.

The inlet 11 communicates with a low pressure chamber 15 through a vertical port 16 in a web 17 positioned between the low pressure chamber and the inlet.

In vertical alinement with the port 16, the base of the casing 10 has an enlarged opening normally closed by a screw cap 18 adapted to support the lower end of a cylindrical screen 19, and being removable to permit cleaning of the parts and to permit inspection of and removal of a valve governing fluid flow through the port 16. The casing 10 and the cap 18 have engaging shouldered portions at 20 so that by means of a suitable gasket between the shoulders a tight joint is secured. When the cap 18 is in position the upper end of the screen 19 abuts the web 17 around the port 16 and the screen is effective to filter water passing from the inlet 11 to the low pressure chamber 15.

In the port 16 there is centrally positioned a valve stem 21. The upper end of the stem 21 is enlarged at 22 to provide a large bearing area, and is continued in reduced section to its end where a nut 23 is threaded on. The nut 23 has an enlarged lower portion 24 providing a large bearing area.

The stem 21 is centrally supported by a pair of dished diaphragms 25 which are seated on the casing 10, and which are held in position by a hood 26 screwed into position to engage the marginal portions of the diaphragms, in a manner described fully in my copending application Serial No. 528,554, filed on April 8, 1931. The relatively large bearing area of the enlarged portion 22 of the stem is effective to prevent wabbling of the stem as the diaphragms move.

Interposed between the diaphragms 25 and the enlarged portion 22 of the stem 15 is a washer 27 of fiber, or a similar material.

Interposed between the enlarged portion 24 of the nut 23 is another washer 28, of soft rubber or the like.

A cap 29, of soft rubber, or the like, is fitted over the nut 23 and the cap is provided with an integral terminal flange 30 to provide a seat for the lower end of a coiled compression spring 31 housed in the hood 26.

An adjusting screw 32 is threaded through the head of the hood 26, and bears against a pressure plate 33 provided with a lower portion reduced to enter the spring 31. A cap 33', of soft rubber, or the like, is fitted over the reduced portion of the pressure plate to provide a resilient seat for the upper end of the spring 31.

It will now be obvious that the dished diaphragms provide a stem actuating means having a snap action, and that the washers 27 and 28 and the caps 29 and 33' provide means to eliminate metallic noises in the operating of the regulator in service. These means also perform the additional function of actuating as resilient connectors between the stem and the spring to prevent hunting of the valve, to be described, about its closing position, at which position there is a tendency for the valve to hunt as the pressure differential decreases. The port 16 is provided with a valve seat member 34 which is threaded in position in the web 17, and the seat member is provided with an enlarged portion 35 to abut the web and form a tight joint therewith. The lower end of the seat member 34 is provided with an extension 36 which is rounded at its seating portion to cooperate with a valve head, to be described, to produce a Venturi channel effect.

Near its lower end, the stem is enlarged at 37, and the enlargement presents a flat lower seating face and a convex curved upper face 38 with a relatively large radius.

The lower end of the stem 21 is threaded, and a shallow metal cup or socket 39 is threaded on the stem, and is held in assembled position thereon by a screw cap 40 fitted over the lower end of the stem.

Molded into the socket 39 is the valve head 41 of a rubber composition resistant to the action of hot water, and having a hardness of in the vicinity of 55 as indicated by a durometer. It will be noted that the molded composition is shaped so that it and the enlarged portion 38 of the stem 21 together present a valve head having a substantially hemispherical surface. The composition 41 is adapted to engage the extension 36 of the valve seat member 34 and cooperate therewith to control the flow of fluid through the port 16. As the valve opens, as best shown in Figure 2, the cooperating surfaces of the valve seat and the valve head are adapted to produce a Venturi effect in the flow of fluid, and thereby reduce resistance to flow and the occurrence of eddies in the flow of fluid through the port.

Because of the manner in which the valve parts have been shaped it has been found possible, with a given size of valve, to fill the heating system with water in but a fraction of the time heretofore necessary, with a pronounced saving in the cost of labor.

As the regulator valve of a hot water heating system moves about its closing position it hunts and chatters. Probable causes of this hunting and chattering are fluid inertia, eddies, inertia of the moving parts and the periodicity of the sprng and diaphragm.

The value of my invention closes silently and positively, and the resilient caps on the pressure member and on the nut perform the function of eliminating metallic conduction of sound and metal to metal clicking or hammering, and also that of modifying the periodicity of the moving system and the manner in which force is applied to the moving valve.

It will, of course, be understood that various details of construction may be varied through a wide range without departing from the principles of this invention, and it is, therefore, not purposed to limit the patent granted hereon otherwise than necessitated by the scope of the appended claims.

I claim:

1. In a regulator for a hot water heating system, a metal casing adapted to be connected to the piping of the system, a metal diaphragm in the casing, a coiled compression metal spring engaging the diaphragm and the casing, a valve having its stem secured to the diaphragm for actuation of the valve by the spring and the diaphragm, and silencing means interposed between the casing and the spring and between the spring and the diaphragm.

2. In a regulator for a hot water heating system, a metal casing adapted to be connected to the piping of the system, a valve in the casing, a plurality of metal members in the casing movably connected to said valve to actuate the valve, and silencing means of soft rubber interposed between said metal members.

3. A regulator comprising a casing, a ported member having a rounded terminal portion providing a valve seat a valve stem positioned movable centrally in said ported member, a non-metallic valve secured to said stem to abut a portion thereof, said valve and said stem portion being shaped to present a substantially hemispherical convex surface whereby to produce a Venturi effect as the valve opens to permit flow of liquid, valve actuating means, said valve actuating means comprising a metal diaphragm connected to said stem, a coiled compression spring connected to said diaphragm, and a non-metallic resilient member interposed between said spring and said diaphragm.

4. A regulator comprising a casing, a ported cylindrical member having a rounded terminal portion providing a valve seat, a valve stem positioned movable centrally in said ported member, a shallow metal cup secured in said stem, a non-metallic valve member in said cup and positioned abutting an enlarged portion of said stem, said enlarged portion of said stem and said valve member being shaped to present together a substantially hemispherical convex surface whereby to produce a Venturi effect as the valve opens to permit flow of water.

WILLIAM T. BIRCH.